United States Patent [19]

Hessman et al.

[11] Patent Number: 5,004,380
[45] Date of Patent: Apr. 2, 1991

[54] CUTTING INSERT

[75] Inventors: Ingemar Hessman; Karl G. Y. Post; Lars E. Norgren, all of Sandviken, Sweden

[73] Assignee: Santrade Limited, Lucerne, Switzerland

[21] Appl. No.: 71,918

[22] Filed: Jul. 10, 1987

Related U.S. Application Data

[63] Continuation of Ser. No. 565,215, Dec. 23, 1983, abandoned.

[30] Foreign Application Priority Data

Dec. 27, 1982 [SE] Sweden ................................ 8207421

[51] Int. Cl.$^5$ ............................................. B23B 27/00
[52] U.S. Cl. .................................... 407/114; 407/113
[58] Field of Search ............... 407/113, 114, 115, 116, 407/113

[56] References Cited

U.S. PATENT DOCUMENTS 2,223,831 12/1940 Luers .
3,629,919 12/1971 Trevarrow ......................... 407/113
3,760,474 9/1973 Stein .
4,131,383 12/1978 Powers .

FOREIGN PATENT DOCUMENTS 2510960 9/1976 Fed. Rep. of Germany .
3200191 7/1983 Fed. Rep. of Germany .
2365276 5/1978 France .
764855 10/1980 U.S.S.R. ............................. 407/113
770665 10/1980 U.S.S.R. .

OTHER PUBLICATIONS

Brochure, "Coromant Slitting Cutter with Indexable Inserts for Machining Narrow Slots and Grooves"; C-1140:003-ENG, 1984, Sweden.

Primary Examiner—Frederick R. Schmidt
Assistant Examiner—Blynn Shideler
Attorney, Agent, or Firm—Burns, Doane, Swecker & Mathis

[57] ABSTRACT

A cutting insert for a slot milling tool is provided with recesses in the cutting corners behind each second cutting edge in the flank wear direction of the cutting insert. A shank of the recess and the second cutting edge form a narrow flange which limits the surface exposed to flank wear.

7 Claims, 2 Drawing Sheets

CUTTING INSERT

This application is a continuation of application Ser. No. 06/565,215, filed Dec. 23, 1983, now abandoned.

BACKGROUND OF THE INVENTION

This invention relates to a cutting insert for a slot milling tool, whose basic form is a parallelpiped, comprising two opposed side surfaces and four end surfaces extending therebetween, a first cutting edge provided at or near the line of juncture between adjacent end surfaces, second cutting edges defined by the lines of juncture between the side surfaces and an end surface provided with a chip surface.

Conventional cutting inserts of the above identified type are afflicted with disadvantages. Conventional slot milling tools either have a wide cutter body to receive an insert, inserted with a large relief angle giving a wide slot and little flank wear or a narrow cutter body able to receive an insert, inserted with only a small relief angle giving a narrow slot and much flank wear. Milling of a narrow slot in a work piece demands a narrow cutter body and a small relief angle for the inserts held in the cutter body. The small relief angle will accelerate the flank wear on the surfaces surround the cutting edges during milling with conventional inserts. Besides an unavoidable wear of the main cutting edge, the side surfaces of the insert will also be worn as they increasingly rub against the walls of the slot, causing large axial cutting forces on the cutting insert and the cutter body due to increased friction. The friction develope heat on the insert and in the slot and this results in a premature insert breakdown due to fragmentation, plastic deformation, etc.

SUMMARY OF THE INVENTION

An object of this invention is to provide a cutting insert which can minimize the above-mentioned problems. This object and other objects of the invention are provided by an insert of the above-mentioned type with a recess formed at a side surface behind the adjacent second cutting edge in the wear direction of the cutting insert whereby the recess emerges into the end surface behind the first cutting edge in the wear direction of the insert so that the second cutting edge and the adjacent recess will form a narrow flange in the side surface for limitation of the flank wear extension.

THE DRAWING

A preferred embodiment of the present invention is described more closely in the following in connection with the accompanying drawing figures, in which.

DETAILED DESCRIPTION OF A PREFERRED EMBODIMENT OF THE INVENTION

Figure 1:
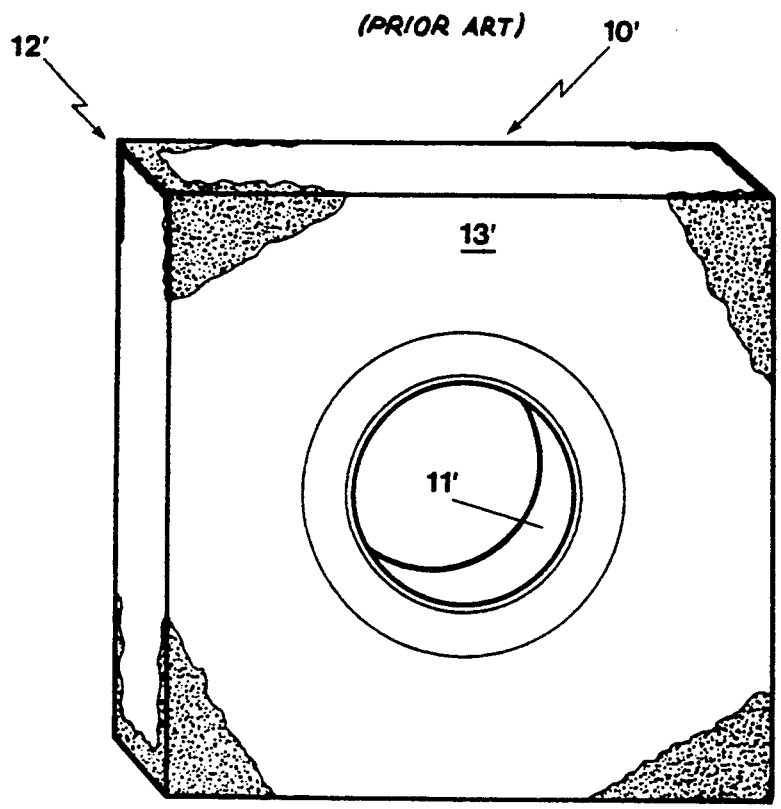
FIG. 1 is a perspective view of a worn conventional insert.

FIG. 1 shows who a conventional, symmetrical insert 10' provided with a central hole 11' to receive a clamping screw, is affected by the milling of slots. Each cutting corner 12' has been used. The insert 10' has been fitted into a site in a cutter body having a small relief angle relative to a side wall of the slot whereby the side surface 13' of the insert' has been worn against a number of side walls. The cutting forces influencing the insert 10' and thereby the cutter body are directly proportional to the area of flank wear of the cutting corner 12' and therefore this insert 10' will result in the previously mentioned disadvantages.

Figure 2:
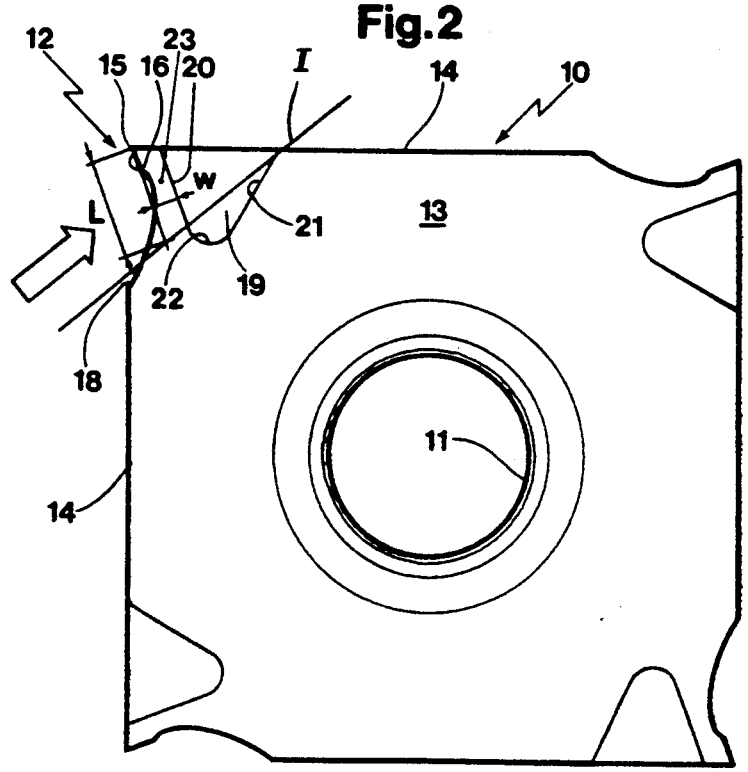
FIG. 2 is a plan view of an insert according to the invention.
Figure 3:
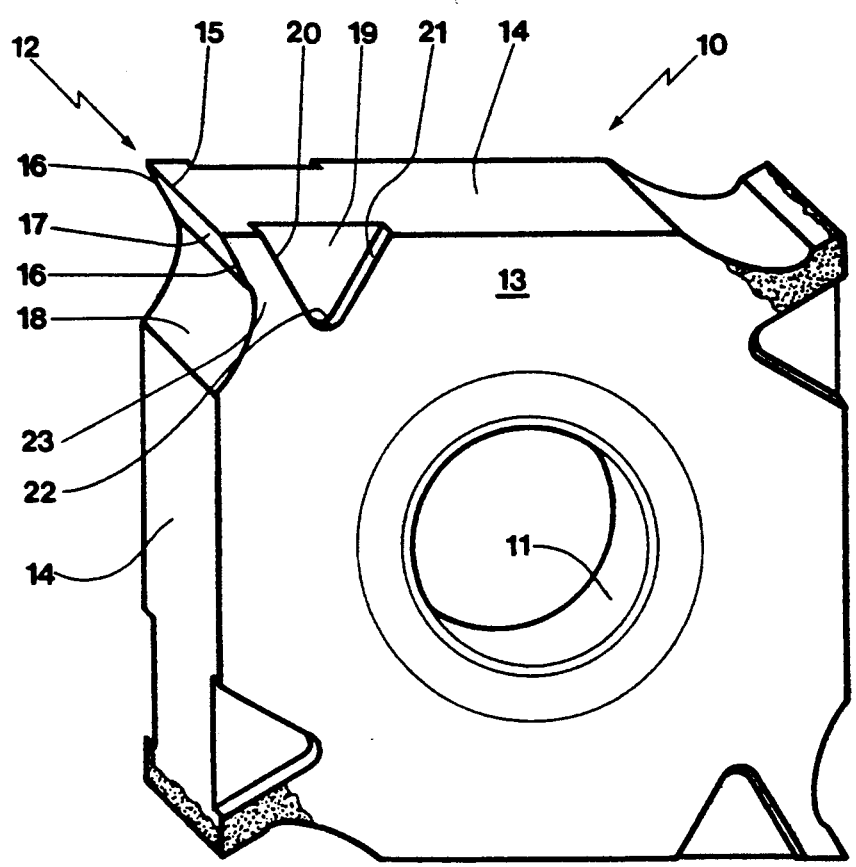
FIG. 3 is a perspective view of the insert in FIG. 2 with two worn cutting corners.

The above mentioned problems are minimized when using an insert according to the present invention which can be seen in FIGS. 2 and 3. The cutting corners 12 of the insert 10 area all identical but in FIG. 3 there are shown two dark diametrically opposed corners which are flank worn. The insert 10 is provided with a central hole 11 to receive a clamping screw. The geometrical basic form of the insert 10 is a parallelepipeds the jacket surface of which is limited by the two opposed side surfaces 13 and a plurality of end surfaces 14 situated therebetween. Each cutting corner 12 is provided with a first cutting edge 15 and two second cutting edges 16. The second cutting edges 16 form a plane 17 with the first cutting edge 15 which is slightly inclined toward the hole 11 in order to create a suitable front edge angle. The plane 17 is contiguous with a concave chip surface 18 formed to receive chips and thereby preventing the same to wedge up. The chip surface 18 is shaped from a number of concave part surfaces of different radius with the part surface of the smallest diameter closest to the plane 17. The thickness of the insert 10 is reduced behind the plane 17 and partly behind the chip surface 18, in the flank wear direction, illustrated by an arrow in FIG. 2, through recesses 19. The recesses 19 are mainly V-shaped whereby the shanks 20, 21 of the recesses 19 form different angles relative to the normal of the end surface 14, into which the recesses 19 emerge. The shanks 20, 21 meet in a round apex 22. The depth of the recess 19 in the transverse direction of the side surface 13 is about 0.18 mm. The depth is somewhat exaggerated in FIG. 3 by reason of clearness only. The form of the recess 19 may also be, for example, a circle, an oval, a square or a wedge, all truncated. It might also be formed as a number of part-recesses. The depth of the recess 19 may also vary so that it increased in direction toward the end surface into which the recess 19 emerges. Between the shank 20 and the second cutting edge 16 a narrow flange 23 remains in the side surface 13 which will be worn during machining of a work piece, whereby the flange 23 will transfer only small axial cutting forces to the cutter body. The maximum wear of the flange 23 is given by an imaginary line I parallel to the wear direction which intersects the point of juncture between the end surface 14 into which the recess 19 emerges and the shank 21. The line of extension of the plane 17 from the first cutting edge 15 to the intersection point with the line I defines the maximum length L of the second cutting ede 16 which length L is maximum four times larger than the width W of the flange 23. The width W is defined as the perpendicular distance between the shank 20 and the extension line.

Milling of narrow slots with an insert according to the present invention has the advantage of having a small relief angle without shortening the term of life of the insert or impairing the stability of the cutter body.

We claim:

1. A replaceable slot-cutting milling insert for a rotary slot milling tool, said insert having the configuration of a parallelepiped with two parallel side surfaces and four end surfaces extending therebetween to define four corners, and wherein each said corner comprises a major cutting edge provided at the juncture between two adjacent end surfaces and perpendicular to the side surfaces, two minor cutting edges defined by the lines of juncture between said side surfaces and one end surface, each of said minor cutting edges being perpendicular to an adjacent major cutting edge, and a concave chip receiving surface in the end surface adjacent each of said cutting edges, said side surfaces having a direction of wear, and means for reducing wear in the side surfaces at each corner comprising recess means in the side surfaces located behind each of said minor cutting edges in the direction of wear and a narrow flange separating each recess from its associated minor cutting edge.

2. An insert according to claim 1, wherein said flanges at said four corners of each said side surface lie in a common plane.

3. An insert according to claim 1, wherein the length L of each of the minor cutting edges is at the most four times larger than the width W of the flange.

4. An insert according to claim 1, wherein said recess means is V- or wedge-shaped, opening outwardly of said insert.

5. An insert according to claim 4, wherein said recess means has a rounded apex.

6. A cutting insert according to claim 1, wherein the depth of the recess means is constant throughout its extent.

7. A cutting insert according to claim 1, wherein the cutting insert is a throwaway insert with identically shaped corners.

* * * * *